(12) United States Patent
Bergquist et al.

(10) Patent No.: US 12,252,151 B2
(45) Date of Patent: Mar. 18, 2025

(54) METHOD FOR DETERMINING RELIABILITY OF RECEIVED DATA

(71) Applicant: Volvo Truck Corporation, Gothenburg (SE)

(72) Inventors: Stefan Bergquist, Gothenburg (SE); Wilhelm Wiberg, Askim (SE); António Amaral Craveiro, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 192 days.

(21) Appl. No.: 17/766,687

(22) PCT Filed: Oct. 21, 2019

(86) PCT No.: PCT/EP2019/078523
§ 371 (c)(1),
(2) Date: Apr. 5, 2022

(87) PCT Pub. No.: WO2021/078353
PCT Pub. Date: Apr. 29, 2021

(65) Prior Publication Data
US 2023/0142252 A1    May 11, 2023

(51) Int. Cl.
*B60W 60/00* (2020.01)
*B60W 40/105* (2012.01)
*G07C 5/00* (2006.01)

(52) U.S. Cl.
CPC ........ *B60W 60/001* (2020.02); *B60W 40/105* (2013.01); *G07C 5/008* (2013.01); *B60W 2420/403* (2013.01); *B60W 2420/408* (2024.01)

(58) Field of Classification Search
CPC ............ B60W 60/001; B60W 40/105; B60W 2420/403; B60W 2420/408; G07C 5/008; H04W 12/106; H04W 12/121; H04W 4/46; H04L 63/1425
See application file for complete search history.

(56) References Cited

U.S. PATENT DOCUMENTS

| | | | |
|---|---|---|---|
| 10,185,999 B1 | 1/2019 | Konrardy et al. | |
| 2011/0080302 A1 | 4/2011 | Muthaiah et al. | |
| 2015/0200957 A1 | 7/2015 | Zhang et al. | |
| 2017/0025017 A1 | 1/2017 | Thomas et al. | |

(Continued)

FOREIGN PATENT DOCUMENTS

| | | |
|---|---|---|
| GB | 2524393 A | 9/2015 |
| WO | 19076464 A1 | 4/2019 |

OTHER PUBLICATIONS

Schmidt, R. et al., "Vehicle Behavior Analysis to Enhance Security in VANETs," Proceedings of 4th Workshop on Vehicle to Vehicle Communications (V2VCOM 2008), Jun. 2008, 8 pages.

(Continued)

*Primary Examiner* — Shon G Foley
(74) *Attorney, Agent, or Firm* — Withrow & Terranova, PLLC

(57) ABSTRACT

The present disclosure relates to a computer implemented method for determining a reliability level of data received by an ego vehicle from a target vehicle being different from the ego vehicle. The present disclosure also relates to a corresponding control system and to a computer program product.

20 Claims, 4 Drawing Sheets

(56) References Cited

U.S. PATENT DOCUMENTS

2018/0268311 A1    9/2018  Vasters
2019/0068582 A1    2/2019  Kim et al.
2019/0312896 A1   10/2019  Petit et al.
2020/0023839 A1*   1/2020  Yan ..................... B60W 40/09

OTHER PUBLICATIONS

Sedjelmaci, H. et al., "Predict and prevent from misbehaving intruders in heterogeneous vehicular networks," Vehicular Communications, vol. 10, Oct. 2017, Elsevier Inc., pp. 74-83.
International Search Report and Written Opinion for International Patent Application No. PCT/EP2019/078523, mailed Jul. 29, 2020, 18 pages.
International Preliminary Report on Patentability for International Patent Application No. PCT/EP2019/078523, mailed Oct. 22, 2020, 17 pages.
Notification to Grant for Chinese Patent Application No. 201980101503.9, mailed Jul. 3, 2024, 6 pages.

* cited by examiner

METHOD FOR DETERMINING RELIABILITY OF RECEIVED DATA

This application is a 35 USC 371 national phase filing of International Application No. PCT/EP2019/078523, filed Oct. 21, 2019, the disclosure of which is incorporated herein by reference in its entirety.

TECHNICAL FIELD

The present disclosure relates to a computer implemented method for determining a reliability level of data received by an ego vehicle from a target vehicle being different from the ego vehicle. The present disclosure also relates to a corresponding control system and to a computer program product.

BACKGROUND

Recently there have been great advances in driver assistance and safety functions, such as adaptive cruise control, pedestrian detection, front and rear collision warning, lane departure warning and general obstacle detection. To achieve such functionality the vehicles are typically equipped with sophisticated sensors and advanced internal computer systems.

Vehicle-to-vehicle-based communication (V2V) is a further method for allowing a plurality of vehicles therebetween, for example to be used in relation to traffic management, collision warning, and collision avoidance. Such systems can extend an ego vehicle's range of awareness of surrounding environmental conditions by providing relevant information regarding the status of traffic in addition to any safety related events occurring in proximity to or detected by vehicles near the ego vehicle.

A substantial cost is involved in incorporating security protection regards to V2V applications. The cost incurred is that of the computational power required to process security, specifically for creating a secure message at the transmitter and to verify the integrity of this secure message at a receiving node. The information exchanged between the vehicles in V2V communications must be secured to prevent a malicious user from hacking into the communication system and presenting false data which disrupts the V2V application service.

One approach for securing that the data received at the ego vehicle is correct is disclosed in US20110080302, suggesting that the received data is compared to what may be considered to be "physically correct", by comparing the data with known physical laws. Such an approach will of course limit any form of "extreme" data to be erroneously introduced when operating the ego vehicle. However, solely relying on physical laws may still allow the introduction of "fairly" relevant data that still is malicious and as such will impact the operation of the ego vehicle in a negative manner. Accordingly, it would be desirable to provide further enhancements for improving handling of data received from other vehicles, ensuring a safe operation of the ego vehicle.

SUMMARY

According to an aspect of the present disclosure, the above is at least partly alleviated by a computer implemented method for determining a reliability level of data received by an ego vehicle from a target vehicle being different from the ego vehicle and arranged in a vicinity of the ego vehicle, the ego vehicle comprising a control unit, wherein the method comprises the steps of receiving, at the control unit and using wireless communication, a first set of operational data relating to the target vehicle, and determining, by the control unit, the reliability level based on the first set of operational data and a predetermined model indicative of an expected behavior of the first set of operational data.

The overall idea with the present disclosure is to further improve the way data received from another vehicle, denoted above as a target vehicle, is ensured to be reliable. The operational data may for example be vehicle-to-vehicle (V2V) data relating to at least one of a velocity, an acceleration, a retardation, etc. for the target vehicle. In line with the present disclosure, this is achieved by comparing data received from said target vehicle with a predetermined model indicative of an expected behavior of the first set of operational data. Accordingly, the present inventors have, as indicated above, identified that it will be insufficient to only rely on known physical laws when deciding of received data is to be considered reliable. Rather, in line with the present disclosure a holistic approach is taken in regards to how to handle the data, reviewing the behavior of the data rather than simply comparing the data to general thresholds.

Advantages following the use of the presently disclosed solution will allow for an overall improvement in safe operation of the ego vehicle and as a consequence vehicle and persons in the vicinity of the ego vehicle, since the risk of relying on erroneous data when operating the ego vehicle is reduced.

In an embodiment of the present disclosure the predetermined model is further dependent on the target vehicle. That is, it may in line with the present disclosure be possible to form different models for different vehicle, for example based on different vehicle types, models, etc. As such, a step in operating the vehicle based on the received data may include requesting the target vehicle to present an identification, such that e.g. the ego vehicle in turn may perform the determination of the reliability level based on a model selected for the specific target vehicle. In one embodiment, the ego vehicle is arranged in communication with e.g. an external server for acquiring the predetermined model for the specific target vehicle. However, a plurality of different predetermined models may also, as an alternative, be stored onboard the ego vehicle. The identification of the target vehicle may also or alternatively be performed by means of a (second) sensor comprised with the ego vehicle.

Preferably, it may be desirable to allow the predetermined model to be further dependent on an expected variation over time of the first set of operational data. That is, as indicated above it is in line with the present disclosure desirable to look at an overall behavior of the data then just compare a single data point to e.g. a preset threshold. Looking at the overall behavior over time will greatly improve the determination of the reliability level for the received data.

In one embodiment of the present disclosure the method further comprises the steps of determining, by the control unit, a second set of operational data relating to the target vehicle using a first sensor comprised with the ego vehicle, and determining, by the control unit, a difference between the first set of operational data and the second set of operational data, wherein the determination of the reliability level is further based on the determined difference. The first sensor may in some embodiments be at least one of a radar, a LiDAR sensor or a camera. Accordingly, in such an embodiment the data may be correlated with "reference data" that is to be collected "locally" at the ego vehicle. That said, it may in some instances not be possible to achieve the same granularity of the data collected by the ego vehicle, thus not making the comparison to be a one-to-one comparison. For example, data collected using a radar sensor comprised with the ego vehicle may not be directly comparable to speed data received by the target vehicle, since the radar sensor may have an in comparison slower response curve. Accordingly, it may in some instances of the present disclosure be useful to form an expected behavior of the second set of operational data, possibly being dependent on a response curve for the sensor generating the second set of data. Thus, to be reliable the data received from the target vehicle should behave in a specific way as compared to the "behavior" of the second set of data. It should be understood that the predetermined model in some embodiments may represent a statistical behavior for the sets of operational data.

It may in line with the present disclosure be possible to use the reliability level as e.g. a "weight" when using the data received from the target vehicle. That is, data having an in comparison low reliability level may be given an in comparison lower weight when operating the vehicle, as compared to data considered to have an in comparison high reliability level. That said, it may also, as an alternative be possible to further include the step of defining the operational data from the target vehicle as reliable only if the reliability level is above a first predetermined threshold. In such an embodiment it may for example be possible to simply discard data from the target vehicle that is considered to have a "too low" (below the threshold) reliability level. The threshold may be fixed, dependent on the type of vehicle, the type of data or based on a history of data received from the target vehicle.

In line with the above discussion, it may in a corresponding manner be possible to define the operational data from the target vehicle as unreliable if the reliability level is below a second predetermined threshold. Accordingly, the data received from the target vehicle may for example be "weighted" in when operating the ego vehicle, as long as the data at least is above the second threshold. Also, the second threshold may be dependent on the type of vehicle, the type of data or based on a history of data received from the target vehicle. The second threshold is typically lower as compared to the first threshold.

Furthermore, in some embodiments it may be possible to also update the model for the vehicle. It may however be desirable to only update the model if the received data is considered to be in comparison highly reliable. Accordingly, in some embodiments of the present disclosure a third threshold is used, where the reliability level is compared to the third threshold, the third threshold being higher as compared to the first threshold. In this case, the model is only updated if the reliability level is above the third threshold.

According to another aspect of the present disclosure there is provided a control system comprised with an ego vehicle, the control system adapted for determining a reliability level of data received by the ego vehicle from a target vehicle being different from the ego vehicle and arranged in a vicinity of the ego vehicle, the control system comprising a control unit, wherein the control unit is adapted to receive, using wireless communication, a first set of operational data relating to the target vehicle, and determine the reliability level based on the first set of operational data and a predetermined model indicative of an expected behavior of the first set of operational data. This aspect of the present disclosure provides similar advantages as discussed above in relation to the previous aspect of the present disclosure.

The control system may in one embodiment include an electronic control unit (ECU), typically provided as an onboard component of the vehicle. Correspondingly, the first sensor may for example include sensors for determining what is happening in a surrounding of the vehicle, for example including at least one of a radar, a LiDAR sensor and/or a camera. Other sensors for measuring speed, acceleration, inclination, torque, vehicle mass, etc. may be equally used in line with the present disclosure.

Furthermore, the vehicle may for example be any one of a truck, a car, a bus or a working machine. The vehicle may furthermore be a vehicle operated by a driver/operator or an autonomous vehicle. Since the vehicle may be one of e.g. a construction equipment or a working machine, the expression road as used above should be interpreted broadly, including any dedicated areas where the vehicle is operating. The vehicle may furthermore be at least one of a pure electrical vehicle (PEV) and a hybrid electric vehicle (HEV).

The expression "autonomous vehicle" should be interpreted broadly and relates to a vehicle that is operated in a fully or partially autonomous mode. In a partially autonomous vehicle, some functions can optionally be manually controlled (e.g. by a driver) some or all of the time. Further, a partially autonomous vehicle may be configured to switch between a fully-manual operation mode and a partially-autonomous and/or a fully-autonomous operation mode.

According to a further aspect of the present disclosure there is provided a computer program product comprising a non-transitory computer readable medium having stored thereon computer program means for operating a control system comprised with an ego vehicle, the control system adapted for determining a reliability level of data received by the ego vehicle from a target vehicle being different from the ego vehicle and arranged in a vicinity of the ego vehicle, the control system comprising a control unit, wherein the computer program product comprises code for receiving, at the control unit and using wireless communication, a first set of operational data relating to the target vehicle, and code for determining, by the control unit, the reliability level based on the first set of operational data and a predetermined model indicative of an expected behavior of the first set of operational data. Also this aspect of the present disclosure provides similar advantages as discussed above in relation to the previous aspects of the present disclosure.

The computer readable medium may be any type of memory device, including one of a removable nonvolatile random-access memory, a hard disk drive, a floppy disk, a CD-ROM, a DVD-ROM, a USB memory, an SD memory card, or a similar computer readable medium known in the art.

Further advantages and advantageous features of the present disclosure are disclosed in the following description and in the dependent claims.

BRIEF DESCRIPTION OF THE DRAWINGS

With reference to the appended drawings, below follows a more detailed description of embodiments of the present disclosure cited as examples.

In the drawings.

DETAILED DESCRIPTION OF EXAMPLE EMBODIMENTS OF THE INVENTION

Figure 1A:
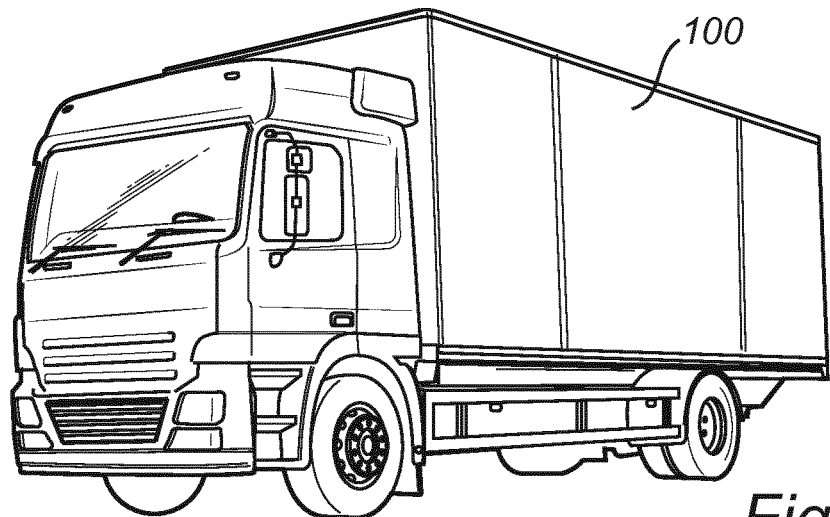
FIG. 1A illustrates a truck, 1B a bus and 1C a wheel loader in which the control system according to the present disclosure may be incorporated.

The present disclosure will now be described more fully hereinafter with reference to the accompanying drawings, in which currently preferred embodiments of the present disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

Figure 1B:
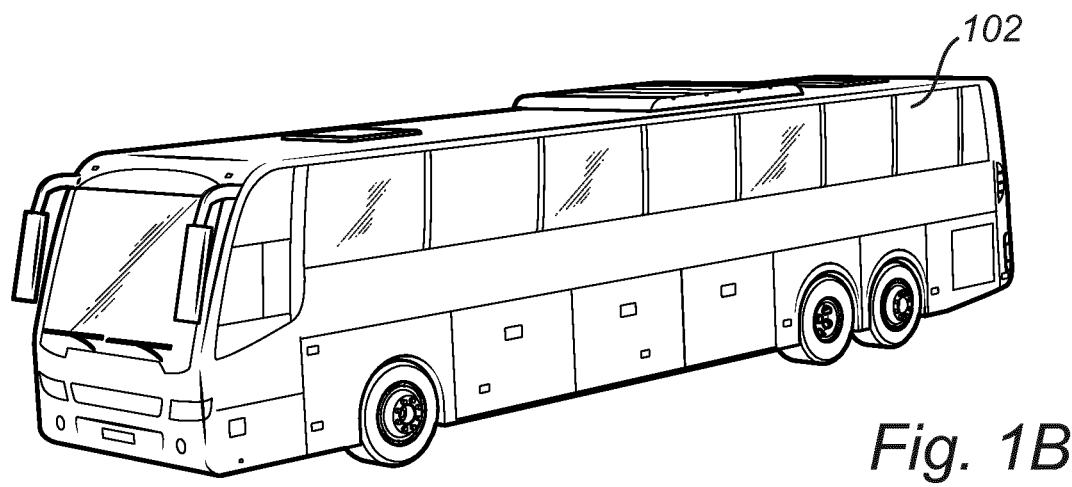
Figure 1C:
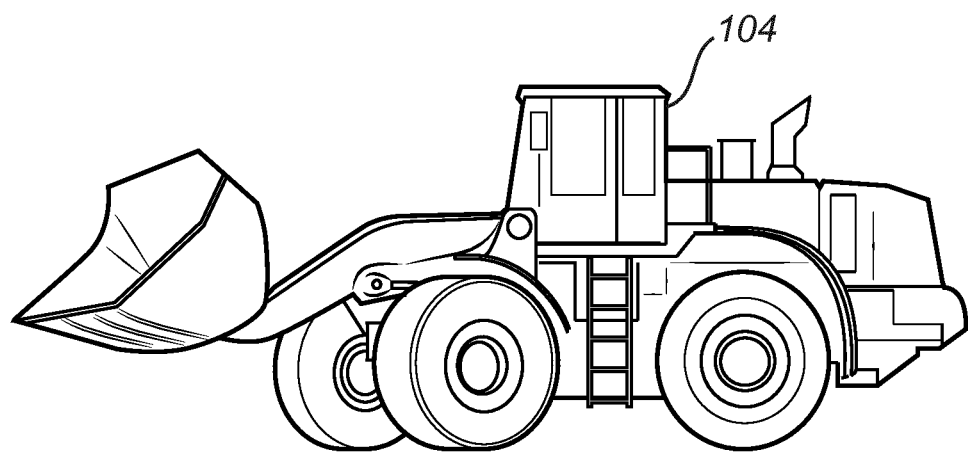
Figure 2:
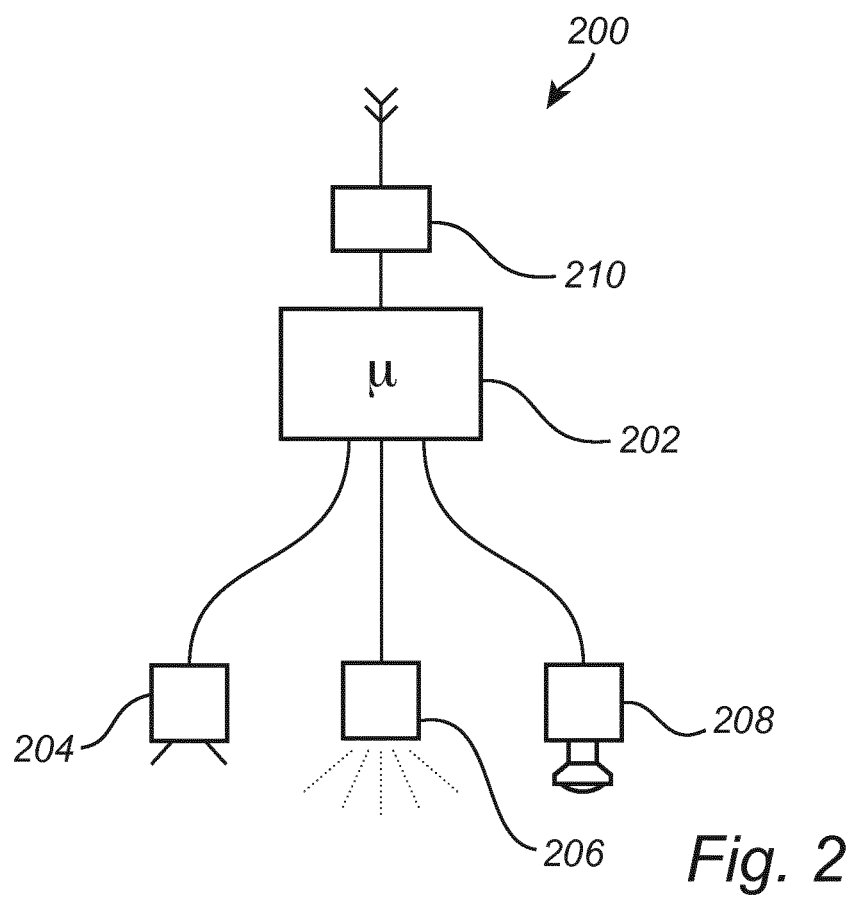
FIG. 2 illustrates a conceptual control system in accordance to a currently preferred embodiment of the present disclosure.

Referring now to the drawings and to FIG. 1A in particular, there is depicted an exemplary vehicle, here illustrated as a truck 100, in which a control system 200 (as shown in FIG. 2) according to the present disclosure may be incorporated. The control system 200 may of course be implemented, possibly in a slightly different way, in a bus 102 as shown in FIG. 1B, wheel loader as shown in FIG. 1C, a car, a bus, etc.

The vehicle may for example be one of an electric or hybrid vehicle, or possibly a gas, gasoline or diesel vehicle. The vehicle comprises an electric machine (in case of being an electric or hybrid vehicle) or an engine (such as an internal combustion engine in case of being a gas, gasoline or diesel vehicle). The vehicle may further be manually operated as well as fully or semi-autonomous.

FIG. 2 shows a conceptual and exemplary implementation of the control system 200, comprising a control unit 202, such as an electronic control unit (ECU), adapted for operating an ego vehicle, e.g. any one of the vehicles 100, 102, 104. The ECU 202 implements an interface for receiving data from a plurality of sensors 204, 206, 208, such as e.g. a radar 204, a LiDAR sensor arrangement 206 and a camera 208. The control system 200 further comprises a transceiver 210, arranged in communication with the control unit 202, where the transceiver 210 is adapted for wirelessly receiving data from a target vehicle 302 (as shown in FIG. 3) in a vicinity of the ego vehicle.

For reference, the ECU 202 may for example be manifested as a general-purpose processor, an application specific processor, a circuit containing processing components, a group of distributed processing components, a group of distributed computers configured for processing, a field programmable gate array (FPGA), etc. The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The ECU 202 may preferably also be arranged in communication with e.g. a radionavigation system, for example including a GPS receiver 220 as well as a map database 222 e.g. holding map navigation data relating to a road where the vehicle 100, 102, 104 is travelling.

Figure 3:
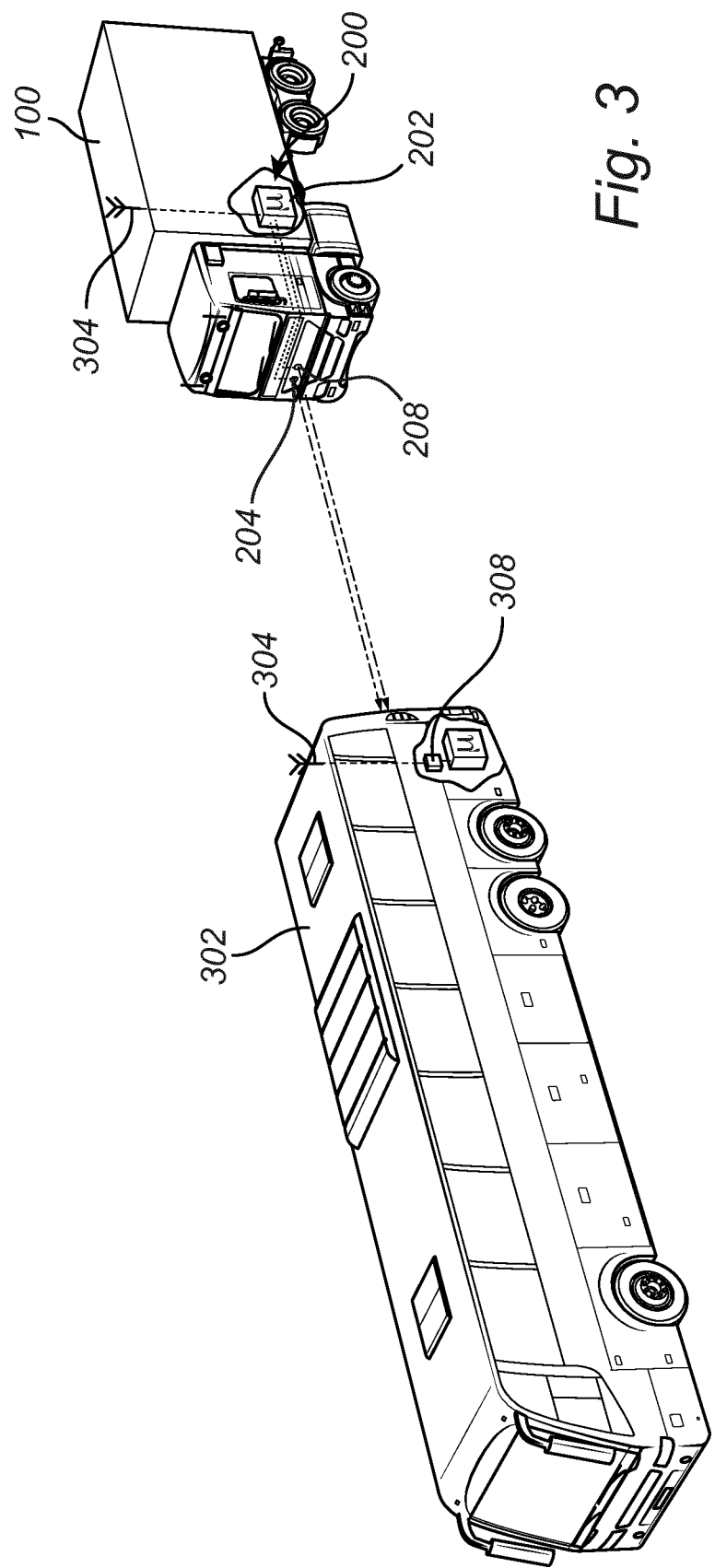
FIG. 3 exemplifies an operation of the control system.
Figure 4:
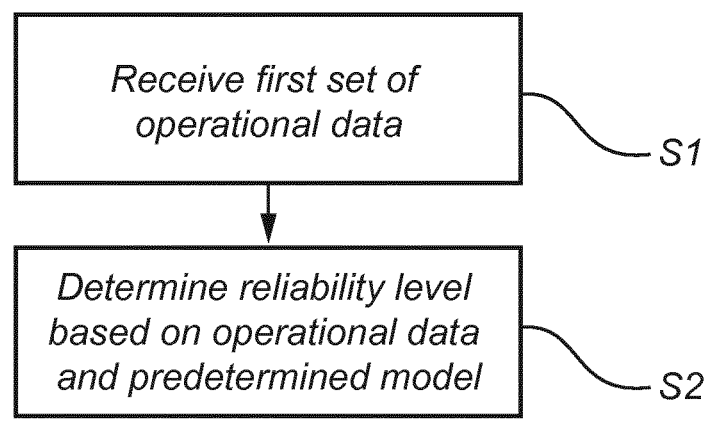
FIG. 4 illustrates the processing steps for performing the method according to the present disclosure.

During operation of the control system 200 for use in relation to the vehicle 100, 102, 104, with further reference to FIGS. 3 and 4, the ECU 202 is adapted to implement the scheme according to the present disclosure for determining a reliability level of data received by an ego vehicle (exemplified as vehicle 100) from a target vehicle 302 being different from the ego vehicle 100.

In an exemplary implementation, the transceiver 210 (nor explicitly shown in FIG. 3) is connected to an antenna 304 comprised with the ego vehicle 100, where the antenna 304 is adapted to receive wireless signals transmitted from e.g. the target vehicle 302. The target vehicle 302 may, typically, be equipped with a corresponding antenna 304 and a transceiver 308. The target vehicle 302 may typically also be equipped with an ECU 310.

In FIG. 3 the ego vehicle 100 is shown as following the target vehicle 302, in relation to an overall travel direction. At a front end of the ego vehicle 100 there are arranged the previously mentioned radar 204 and a camera 208. As indicated above, other sensors are possible and within the scope of the present disclosure. The radar 204 may be adapted to continuously collect data that may be used to determine a distance between e.g. the front end of the ego vehicle 100 and a back end of the target vehicle 302. Inherently, the data collected using the radar 204 must be processed by the ECU 202 for determining the distance between the vehicles 100, 302. In addition, the radar 204 has a response time, while still being in comparison short, that will impact the distance determination. That is, in case the target vehicle 302 performs a quick braking action it will take a little bit of time until such an action is identified at the ego vehicle 100.

Accordingly, in line with the present disclosure the target vehicle 302 may be adapted to regularly or continuously transmit its momentary speed, acceleration, etc. In some embodiments the wireless transmission may be essentially instantaneously provided between the vehicles 100, 302, such that e.g. the ego vehicle 100 in a situation as discussed above with the quick braking action possibly may allowed to react quicker as compared to if the ego vehicle 100 was to rely solely on the data collected by the radar 204 arranged onboard the ego vehicle 100.

However, wireless transmission of data, such as in the exemplary implementation so called vehicle-to-vehicle (V2V) data may possibly be manipulated, such as by injecting erroneous data or by manipulating the transmitted data. As discussed above, the present disclosure provides means to contravene this risk and uncertainty. This is specifically achieved by adapting the ECU 202 to determine a reliability level of at least some of the data received at the ego vehicle 100 from the target vehicle 302.

Accordingly, the ECU 202 will as a first step receive, S1, at the ego vehicle 100, the V2V data (above also denoted as a first set of operational data) using the antenna 304 and the transceiver 210. Subsequently, the ECU 202 determines the reliability level for the received V2V data based on a content of the V2V data and a predetermined model indicative of an expected behavior of the V2V data. That is, in line with the present disclosure an analysis of the V2V data is performed whereby the V2V data for example may be mapped or otherwise correlated with an expectation of the data. Specifically, rather than just perform a thresholding of the V2V data, typically form removing possible extremes (such as "impossible" velocities or accelerations that are breaking general physical laws), the present disclosure takes a holistic approach whereby e.g. a trend of the content of the V2V data is mapped towards an expectation of the content of the V2V data. In one embodiment of the present disclosure, the predetermined model is made dependent on a statistical and/or historical behavior of the related receive the V2V data, or the type and/or model of the target vehicle 302.

Rather than just removing extremes, it may be possible to identify also erroneous trends in the V2V data received from the target vehicle 302, to such an extent that also errors relating to a sensor comprised with the target vehicle 302 could possibly be identified. To make this possible the ECU 202 is equipped or is arranged to receive the predetermined model, where the predetermined model holds information being indicative of the expected behavior of the V2V data. The comparison between the received V2V data and the predetermined model may in some embodiments be performed by e.g. setting thresholds on the allowed differences between means and variances of the expected behavior and the actual behavior of the content of the V2V data.

In one implementation the predetermined model is dependent on the type of the target vehicle 302. As such an embodiment it may for example be necessary for the target vehicle 302 to transmit some form of reliable identification data to the ego vehicle 100 before the ego vehicle 100 is starting to receive the V2V data. The identification data may then be used by the ECU 202 to acquire a predetermined model that corresponds to the make and/or model or the target vehicle 302.

Alternatively, e.g. the camera 208 comprised onboard the ego vehicle 100 may be used to collect image data relating to the target vehicle 302, whereby the image data may be used by an image processing scheme performed at the ECU 202 to extract information that may be used for identifying the target vehicle 302. For example, the extracted information could be sent from the ego vehicle 100 to a remote server (not shown) where the extracted information may be mapped to a large collection of stored data for determining e.g. the make and/or model of the target vehicle 302.

As understood from the above, the V2V data could in one embodiment be used in an independent form for determining its reliability level. However, in some embodiments the V2V data may be correlated with data that is collected by one of the sensors 204, 206, 208 arranged onboard the ego vehicle 100 (above denoted as a second set of operational data relating to the target vehicle). It could for example be possible to compare or determine a difference between the V2V data and the data from the onboard sensors, where also the result of the comparison or the difference is used in the determination of the reliability level. For example, it could be possible for the ECU 202 to review a trend relating to the determined difference and compare this trend with the predetermined model.

Generally, once the reliability level has been determined for the V2V data, the ego vehicle 100 may select to simply discard the V2V data if the reliability level is below a first threshold. Put differently, if the V2V data is determined to be less reliable than the first threshold then the V2V data will not be used by the ego vehicle 100 in decisions relating to the operation of the ego vehicle.

However, in an alternative embodiment it may be possible to allow the reliability level to dictate at what level (or how much weight) that should be given to the V2V data when operating the ego vehicle 100. For example, if the reliability level is determined to be above 50% but below 70% then the V2V data is given a minor impact in operating the ego vehicle 100. However, if the V2V data is determined highly reliable (e.g. a reliability level between 70-100%), then the V2V data may possibly be used as is in operating the ego vehicle 100.

Within the scope of the present disclosure it may be possible to form the predetermined model at the ego vehicle 100. The predetermined model may also or alternatively be formed at the remote server (or similar) or provided by e.g. the manufacturer of the target vehicle 302 to the remote server (such that the ego vehicle 100 may download and use the predetermined model). It is also possible, and within the scope of the present disclosure, to allow the predetermined model to be updated at the ego vehicle 100. As such, it may over time be possible to allow the ego vehicle 100 to collect and amend the predetermined model to make the model increasingly reliable. It could also be possible to allow the updated model to be shared with other vehicles, such as by uploading the updated model to the remote server.

The present disclosure contemplates methods, devices and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor.

By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data that cause a general-purpose computer, special purpose computer, or special purpose processing machines to perform a certain function or group of functions.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

Additionally, even though the disclosure has been described with reference to specific exemplifying embodiments thereof, many different alterations, modifications and the like will become apparent for those skilled in the art.

Variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A computer implemented method for determining a reliability level of data received by an ego vehicle from a target vehicle being different from the ego vehicle and arranged in a vicinity of the ego vehicle, the ego vehicle comprising a control unit, wherein the method comprises:
receiving, at the control unit and using wireless communication, a first set of operational data relating to the target vehicle,
determining, by the control unit, a second set of operational data relating to the target vehicle using a first sensor comprised with the ego vehicle,
determining, by the control unit, a difference between the first set of operational data and the second set of operational data,
determining, by the control unit, the reliability level based on the determined difference and a predetermined model indicative of an expected behavior of the first and the second set of operational data, and
applying, by the control unit, the determined reliability level as a weight for the first set of operational data when operating the ego vehicle, wherein data having a lower reliability level is given a lower weight compared to data having a higher reliability level.

2. The method of claim 1, wherein the predetermined model is further dependent on the target vehicle.

3. The method of claim 1, wherein the predetermined model is further dependent on an expected variation over time of the first set of operational data.

4. The method of claim 1, wherein the predetermined model is further indicative of an expected behavior of the difference between the first and the second set of operational data.

5. The method of claim 1, further comprising:
defining operational data from the target vehicle as reliable only if the reliability level is above a first predetermined threshold.

6. The method of claim 1, further comprising:
defining operational data from the target vehicle as unreliable if the reliability level is below a second predetermined threshold.

7. The method of claim 1, wherein the first set of operational data relates to at least one of a velocity, an acceleration, and/or a retardation, for the target vehicle.

8. The method of claim 2, further comprising:
determining an identifier for the target vehicle using a second sensor comprised with the ego vehicle.

9. The method of claim 1, wherein the predetermined model represents a statistical behavior for the sets of operational data.

10. The method of claim 1, further comprising:
establishing a network connection with a server arranged offboard the ego vehicle, and
requesting the predetermined model from the remote server.

11. The method of claim 10, further comprising:
determining, by the control unit, an updated model if the reliability level is above a third predetermined threshold.

12. The method of claim 1, wherein the first sensor is at least one of a radar, a LiDAR sensor, or a camera.

13. A control system for an ego vehicle, the control system arranged onboard the ego vehicle and adapted for determining a reliability level of data received by the ego vehicle from a target vehicle being different from the ego vehicle and arranged in a vicinity of the ego vehicle, the control system comprising a control unit, wherein the control unit is adapted to:
receive, using wireless communication, a first set of operational data relating to the target vehicle,
determine a second set of operational data relating to the target vehicle using a first sensor comprised with the ego vehicle,
determine a difference between the first set of operational data and the second set of operational data,
determine the reliability level based on the determined difference and a predetermined model indicative of an expected behavior of the first and the second set of operational data, and
apply the determined reliability level as a weight for the first set of operational data when operating the ego vehicle, wherein data having a lower reliability level is given a lower weight compared to data having a higher reliability level.

14. The system of claim 13, wherein the predetermined model is further dependent on the target vehicle.

15. The system of claim 13, wherein the predetermined model is further dependent on an expected variation over time of the first set of operational data.

16. The system of claim 13, wherein the predetermined model is further indicative of an expected behavior of the difference between the first and the second set of operational data.

17. The system of claim 13, wherein the control unit is further adapted to:
define operational data from the target vehicle as reliable only if the reliability level is above a first predetermined threshold.

18. The system of claim 13, wherein the control unit is further adapted to:
define operational data from the target vehicle as unreliable if the reliability level is below a second predetermined threshold.

19. A vehicle comprising the control system of claim 13.

20. A computer program product comprising a non-transitory computer readable medium having stored thereon computer program means for operating a control system comprised with an ego vehicle, the control system adapted for determining a reliability level of data received by the ego vehicle from a target vehicle being different from the ego vehicle and arranged in a vicinity of the ego vehicle, the control system comprising a control unit, wherein the computer program product comprises:
code for receiving, at the control unit and using wireless communication, a first set of operational data relating to the target vehicle,
code for determining, by the control unit, a second set of operational data relating to the target vehicle using a first sensor comprised with the ego vehicle,
code for determining, by the control unit, a difference between the first set of operational data and the second set of operational data,
code for determining, by the control unit, the reliability level based on the determined difference and a predetermined model indicative of an expected behavior of the first and the second set of operational data, and
code for applying, by the control unit, the determined reliability level as a weight for the first set of operational data when operating the ego vehicle, wherein data having a lower reliability level is given a lower weight compared to data having a higher reliability level.

\* \* \* \* \*